United States Patent [19]

Kresnyak et al.

[11] Patent Number: 5,980,848
[45] Date of Patent: *Nov. 9, 1999

[54] METHOD FOR PRODUCTION OF SODIUM BICARBONATE, SODIUM CARBONATE AND AMMONIUM SULFATE FROM SODIUM SULFATE

[75] Inventors: Steve Kresnyak; Jake Halldorson, both of Calgary, Canada

[73] Assignee: Airborne Industrial Minerals Inc., Calgary, Canada

[*] Notice: This patent is subject to a terminal disclaimer.

[21] Appl. No.: 08/832,798

[22] Filed: Apr. 4, 1997

Related U.S. Application Data

[63] Continuation-in-part of application No. 08/547,773, Oct. 25, 1995, Pat. No. 5,830,422, which is a continuation-in-part of application No. 08/494,073, Jun. 23, 1995, Pat. No. 5,654,351.

[51] Int. Cl.$^6$ ................................ C01B 17/20
[52] U.S. Cl. .................. 423/243.04; 423/243.06; 423/243.08; 423/244.07; 423/244.08
[58] Field of Search .......... 423/243.04, 243.06, 423/243.08, 243.1, 244.07, 244.08, 187, 422, 423, 548, 551, 555; 23/302 T

[56] References Cited

U.S. PATENT DOCUMENTS

| | | | |
|---|---|---|---|
| 4,247,525 | 1/1981 | Voeste | 423/243.08 X |
| 5,585,081 | 12/1996 | Chu et al. | 423/239.1 |
| 5,585,082 | 12/1996 | Ziebarth et al. | 423/244.07 |
| 5,587,134 | 12/1996 | Dannevang | 423/237 |
| 5,587,136 | 12/1996 | Ikeyama et al. | 423/239.1 |
| 5,654,351 | 8/1997 | Kresnyak et al. | 423/423 |

FOREIGN PATENT DOCUMENTS 2032627  6/1992  Canada.

*Primary Examiner*—Michael Lewis
*Assistant Examiner*—Stuart L. Hendrickson
*Attorney, Agent, or Firm*—Paul S. Sharpe, Marks & Clerk

[57] ABSTRACT

There is disclosed a process for recovering sodium bicarbonate and forming ammonium sulfate from a source containing sodium sulfate. The method involves contacting the sodium sulfate in solution with carbon dioxide and a compound containing ammonia. Sodium bicarbonate is precipitated in high purity form from the solution. It is important to maintain the temperature of the source solution at or above 32° C. This provision eliminates contamination of hydrates or ammonium bicarbonate components. The filtrate of the sodium bicarbonate reaction can be further processed to yield an ammonium sulfate product in the concentrated liquid or precipitated form in high purity. The basic process can be expanded to be combined with a conventional Claus process for sulfur recovery as a Tail Gas Unit, or can be further employed in a wet and dry scrubbing process for FGD schemes.

22 Claims, 10 Drawing Sheets

METHOD FOR PRODUCTION OF SODIUM BICARBONATE, SODIUM CARBONATE AND AMMONIUM SULFATE FROM SODIUM SULFATE

This is a continuation-in-part of U.S. application Ser. No. 08/547,773, filed Oct. 10, 1995, now U.S. Pat. No. 5,830,422 which is a continuation-in-part of U.S. application Ser. No. 08/494,073 filed Jun. 23, 1995, now U.S. Pat No. 5,654,351.

FIELD OF THE INVENTION

The present invention relates to a process for generating sodium carbonate compounds and ammonium sulfate and more particularly, the present invention relates to a process for generating the above-mentioned compounds in a substantially pure form from gas streams containing sulfur oxides such as flue gas streams.

BACKGROUND OF THE INVENTION

There have been numerous processes previously proposed for the manufacture of alkaloid carbonate, various sulfates, and the desulfurization of flue gases. One of the primary difficulties with the known procedures for manufacturing, for example, sodium bicarbonate and ammonium sulfate is the fact that a pure product is difficult to obtain when one employs the methods previously set forth in the art.

Typical of the previously proposed methods in this art is U.S. Pat. No. 3,846,535, issued Nov. 5,1974 to Fonseca. The Fonseca reference teaches a method for absorbing sulfur oxides from gaseous mixtures containing sulfur oxides. A sodium bicarbonate or potassium bicarbonate absorbent is employed to achieve this result and the absorbent is regenerated. The Fonseca reference delineates how calcium sulfate may be produced for wallboard, landfill and other such products, but fails to teach a method for producing either pure sodium bicarbonate or ammonium sulfate in purity levels suitable for commercial sale and further for flue gas desulfurization. The Fonseca disclosure indicates that only 67% of the theoretical amount of sodium bicarbonate obtained has an 87% purity therefore leaving a continuous process imbalance without external sodium bicarbonate supply.

A further limitation in the Fonseca reference is that there is no teaching concerning a source of ammonium ions to enhance the effectiveness of the process and result in desirable production of ammonium sulfate and sodium bicarbonate.

Demonstrative of the imprecise teachings in the reference regarding the procedure to achieve the most desirable process and quality products is the passage in column 3 beginning at line 52, wherein it is indicated:

"The aqueous ammonium sulfur oxide mixture produced by the precipitation of sodium bicarbonate can optionally be oxidized and recovered as ammonium sulfate. The ammonium sulfate is useful as a fertilizer and for numerous other industrial purposes."

If this were practiced, there would be a deleterious effect to the overall directive of producing sodium bicarbonate and ammonium sulfate.

Further prior art in this file includes that taught in Canadian Patent No. 543,107, issued Jul. 2, 1957, to Downes. The reference teaches a method of separating polybasic acids from their aqueous solutions and the recovery of ammonium sulfate from aqueous solutions. The disclosure indicates that the treatment of sodium sulfate for the production of sodium bicarbonate and ammonium sulfate may be achieved by exposing the aqueous solution of sulfate to ammonia and carbon dioxide. The result is the precipitation of sodium bicarbonate. Although the Downes method is useful to recover the sodium bicarbonate, there is no teaching in the disclosure concerning how an uncontaminated product of sodium bicarbonate and ammonium sulfate, since these are reciprocal salt pairs capable of the formation of a double salt which can be produced by following the method. In addition, the method as set forth in this reference would appear to be susceptible to the formation of hydrates one being known as Glauber salt when using these salt pairs.

Stiers, in U.S. Pat. No. 3,493,329, issued Feb. 3, 1970, teaches a method of making sodium carbonate. The Stiers method is a co-precipitation method and cannot provide for selective precipitation of desired products since the salts are reciprocal salts and form a double salt. In the Stiers method, the desire is to remove the sulfate anion to use it for the transportation of sodium cations from sodium chloride to the bicarbonating process as sodium sulfate. In addition to the above, the Stiers process involves the continuous recycling of the mother liquor which requires that the ammonium sulfate in the liquor be continuously removed or reduced from the process stream. If the ammonium sulfate reaches a saturation point in the bicarbonating stage, ammonium sulfate will co-precipitate with the sodium sulfate in the form of a double salt compound or two inseparable salts.

Stiers demonstrates a process to generate two salts and double salts rather than a pure single salt, the lafter being much more desirable from a commercial point of view.

Canadian Application Serial Number 2,032,627, offers an innovative technique to produce the desirable pure products. This method employed a number of evaporative and cooling techniques to alter the solubility of sodium sulfate and ammonium sulfate in solution and selectively precipitate the desired pure components. Lab bench scale batch testing of this method demonstrated effective results, however, continuous pilot scale testing clearly identified undesirable limitations to the process as specified. More specifically, the process is difficult to operate in a consistent and continuous mode and as such is highly susceptible to ammonia sulfate contamination with sodium sulfate, resulting in a commercially undesirable double salt product.

In greater detail of the teachings of the Canadian application, it is taught that brine remaining after screening sodium sulfate has a temperature of 95° C. to 60° C., the solubility of ammonium sulfate is decreased while the solubility of sodium sulfate increases. The result is that more ammonium sulfate precipitates while keeping sodium sulfate in solution.

By following the teachings, the mixed solution is supersaturated with sodium sulfate due to evaporation at 95° C. and specifically results in the production of double salt when the ammonium sulfate crystallization step of 60° C. is attempted as a continuous process.

In view of what has been previously proposed in the art, it is clear that a need exists for a process of recovering sodium carbonate compounds and the formation ammonium sulfate from a source of sulfate which overcomes the limitations regarding purity, precipitation, selectivity and other such limitations and reduces sulfur emissions from industrial facilities. The present invention is directed to circumventing the previously encountered difficulties of reciprocating salt pairs and employing the improved process for flue gas desulfurization and inorganic value recovery.

SUMMARY OF THE INVENTION

One object of one embodiment of the present invention is to provide an improved process for the scrubbing of various sulfur compounds from, for example, flue or tail gas streams containing sulfur compounds.

Advantageously, the use of solubility data for sodium bicarbonate, ammonium sulfate and sodium sulfate provides the necessary information for effecting selective precipitation without the contamination of one precipitate effecting a further precipitate as was conventional with the prior art processes. By making use of a solubility data, it is possible to precipitate sodium bicarbonate and ammonium sulfate without precipitating sodium sulfate as a contaminant.

By controlling temperatures and pressures, once a bicarbonate precipitate is formed, the filtrate may be subjected to a purification step wherein the remaining sodium ions are substantially removed or made to be held in solution prior to the precipitation of ammonium sulfate. This results in a cleaner precipitate of ammonium sulfate and therefore results in a more commercially desirable product, which product exceeds purity measures not previously encountered with the prior art processes. In a purification possibility, the filtrate may be supersaturated with ammonia in a conditioning reactor which operates at a substantially cooler temperature, for example, 7° C. This is one example of an appropriate temperature, a suitable range is between about 20° C. to about −40° C. This procedure results in the formation of sodium sulfate or a mixed salt of ammonium sulfate and sodium sulfate, both of which are insoluble at these temperatures and this excess of ammonia. Once precipitated, the filtrate, therefore having a lower concentration of sodium cations inherently leads to a less contaminated precipitated ammonium sulfate.

Several different conditioning processes are also possible which include sodium ion reduction by, for example, ion exchange techniques, refrigeration, evaporation, etc.

The process is further enhanced by providing an ammonia and carbon dioxide chemical recovery scheme for minimizing the chemical consumption to enhance commercial viability. It has been further found that by making use of the basic bicarbonate recovery process, that the process can be used for additional fields of utility, for example, tail gas desulfurization, flue gas desulfurization by wet and/or dry sorbent injection techniques and further applications for making commercial or landfill grade gypsum and fully recovering the ammonia chemical.

Flue gas desulfurization (FGD), an example of which employs dry sorbent, is generally known in the art. This employs the use of sodium bicarbonate typically for 10% to 95% sulfur component reduction. The bicarbonate is initially calcined to sodium carbonate by the flue gas heat, which is typically in the range of 177° C. to 400° C. This then reacts to form sodium sulfate. Because the sorbent is dry, finely ground powder, there is no negligible cooling effect with the flue gas and as such, the stack temperature can be maintained for emission dispersion. Also, the sodium sulfate may be recovered in a baghouse or an electrostatic precipitator with or without the flyash. The sorbent must be processed to a fine particle size, typically 15 $\mu$m and then must be stored under dry condition to prevent hold up and enhance manageability of the dried sorbent in silos and other equipment.

A further object of the present invention is directed to a process which can utilize dry sodium bicarbonate to produce a dry sodium sulfate compound which can be extracted from gases containing sulfur oxide compounds.

According to the object of the present invention, there is provided a method of scrubbing sulfur compounds from gas containing sulfur oxide compounds in a conditioning vessel, comprising the steps of:

a. providing a sodium sulfate solution;

b. contacting the solution with carbon dioxide and ammonia or ammonium ions while maintaining a solution temperature of at least 32° C. to form a precipitate of sodium bicarbonate;

c. recovering as a product the precipitate of sodium bicarbonate in step b.;

d. treating the remaining solution of step c with sufficient ammonia or ammonium ions to form a saturated solution of ammonium sulfate and a precipitated sodium sulfate from the solution;

e. washing residual sodium sulfate out of the precipitate of sodium bicarbonate;

f. dehydrating the precipitate of sodium bicarbonate; and g. introducing dry sodium bicarbonate into the conditioning vessel for the removal of a sulfur oxide compound.

This is acceptable for new plants or existing plants with electrostatic precipitators, baghouses, or other recovery means, but many flue gas desulfurization (FGD) systems currently operating are wet scrubbing systems usually using lime as a reagent to reduce sulfur dioxide emissions. One of the primary difficulties is that these systems tend to be expensive and are plagued with operational difficulties such as corrosion, slurry handling and disposal problems of products, etc.

A further embodiment of the present invention is directed to a process which can utilize a wet scrubbing system and eliminate the corrosion problems, landfill problems and other handling difficulties associated with lime and lime/gypsum slurries.

In accordance with another object of one embodiment of the invention, there is provided a method of scrubbing sulfur compounds from gas containing sulfur oxide compounds and recovering inorganic values, comprising the steps of:

a. providing a sodium sulfate solution;

b. contacting the solution with carbon dioxide and ammonia or ammonium ions while maintaining a solution temperature of at least 32° C. to form a precipitate of sodium bicarbonate;

c. recovering as a product the precipitate of sodium bicarbonate in step b.;

d. treating the remaining solution of step c. with sufficient ammonia or ammonium ions to form a saturated solution of ammonium sulfate and a precipitate of sodium sulfate from the solution;

e. recovering as a product the precipitate of sodium sulfate;

f. recovering ammonium sulfate as a product from the remaining solution from step e.;

g. rehydrating the precipitate of sodium bicarbonate to form a concentrated sodium bicarbonate solution; and h. introducing the sodium bicarbonate solution into a conditioning vessel for the removal of a sulfur oxide compound.

According to a further object of the present invention, there is provided a method of scrubbing sulfur compounds from gas containing sulfur oxide compounds, comprising the steps of:

a. providing a source of sodium sulfate solution;

b. contacting the source of sodium sulfate with carbon dioxide and ammonia or ammonium ions while maintaining a solution temperature of at least 32° C. to form a precipitate of sodium bicarbonate;

c. recovering as a product the precipitate of sodium bicarbonate in step b.;

d. washing residual sodium sulfate out of the sodium bicarbonate precipitate;

e. converting the precipitate of sodium bicarbonate into a sodium carbonate precipitate;

f. rehydrating the sodium carbonate precipitate to form a concentrated sodium carbonate solution; and g. introducing the sodium carbonate solution into a conditioning vessel for the removal of a sulfur oxide compound.

The contacting vessel may comprise any vessel suitable for the treatment of the gas. Examples which are well known include wet scrubbers and spray dryers. It will be appreciated that the conditioning vessel may comprise at least one of each of the above or a combination of many of these.

By integrating the basic bicarbonate recovery process together with the desulfurization process, the result is a scrubbing process which advantageously facilitates recovery of inorganic values, i.e., fertilizer, sodium carbonate, sodium bicarbonate, etc.

A still further object of the present invention is to provide a method of scrubbing sulfur compounds from gas containing sulfur oxide compounds, comprising the steps of:

a. providing a source of sodium sulfate solution;

b. contacting the source of sodium sulfate with carbon dioxide and ammonia or ammonium ions while maintaining a solution temperature of at least 32° C. to form a precipitate of sodium bicarbonate;

c. recovering as a product the precipitate of sodium bicarbonate in step b.;

d. washing residual sodium sulfate out of the sodium bicarbonate precipitate;

e. converting the precipitate of sodium bicarbonate into a sodium carbonate precipitate; and f. introducing dry sodium carbonate into a conditioning vessel for removal of a sulfur oxide compound.

It is well known to those skilled in the art that the Claus process is an effective process for recovering elemental sulfur from hydrogen sulfide ($H_2S$). The inventive process disclosed herein with respect to the ammonium sulfate and sodium bicarbonate production can be used in combination with a Claus sulfur plant recovering both liquid sulfur and sulfur dioxide in the form of ammonium sulfate fertilizer and without a sulfur plant converting all sulfur components to ammonium sulfate fertilizer.

As will be appreciated by those skilled in the art, the precipitation of the above-mentioned precipitates involves exothermic reactions and accordingly, the heat generated may be recovered for further temperature regulation in the process. Further, the refrigeration effect nature of carbon dioxide gas and ammonia under pressure reduction is useful for temperature adjustment and regulation in the process, both directly in the process or indirectly by external means.

Having thus generally described the invention, reference will now be made to the accompanied drawings illustrating preferred embodiments.

BRIEF DESCRIPTION OF THE DRAWINGS

Similar numerals in the drawings denote similar elements.

DETAILED DESCRIPTION OF THE PREFERRED EMBODIMENTS

The chemistry involved according to the present invention can be resolved into the following equations:

$$CO_2+H_2O=H^++HCO_3^-$$

$$NH_3+H_2O=NH_4^++OH^-$$

$$Na_2SO_4+2NH_3+2H_2O+2CO_2=2NaHCO_3+(NH_4)_2SO_4$$

Figure 1:
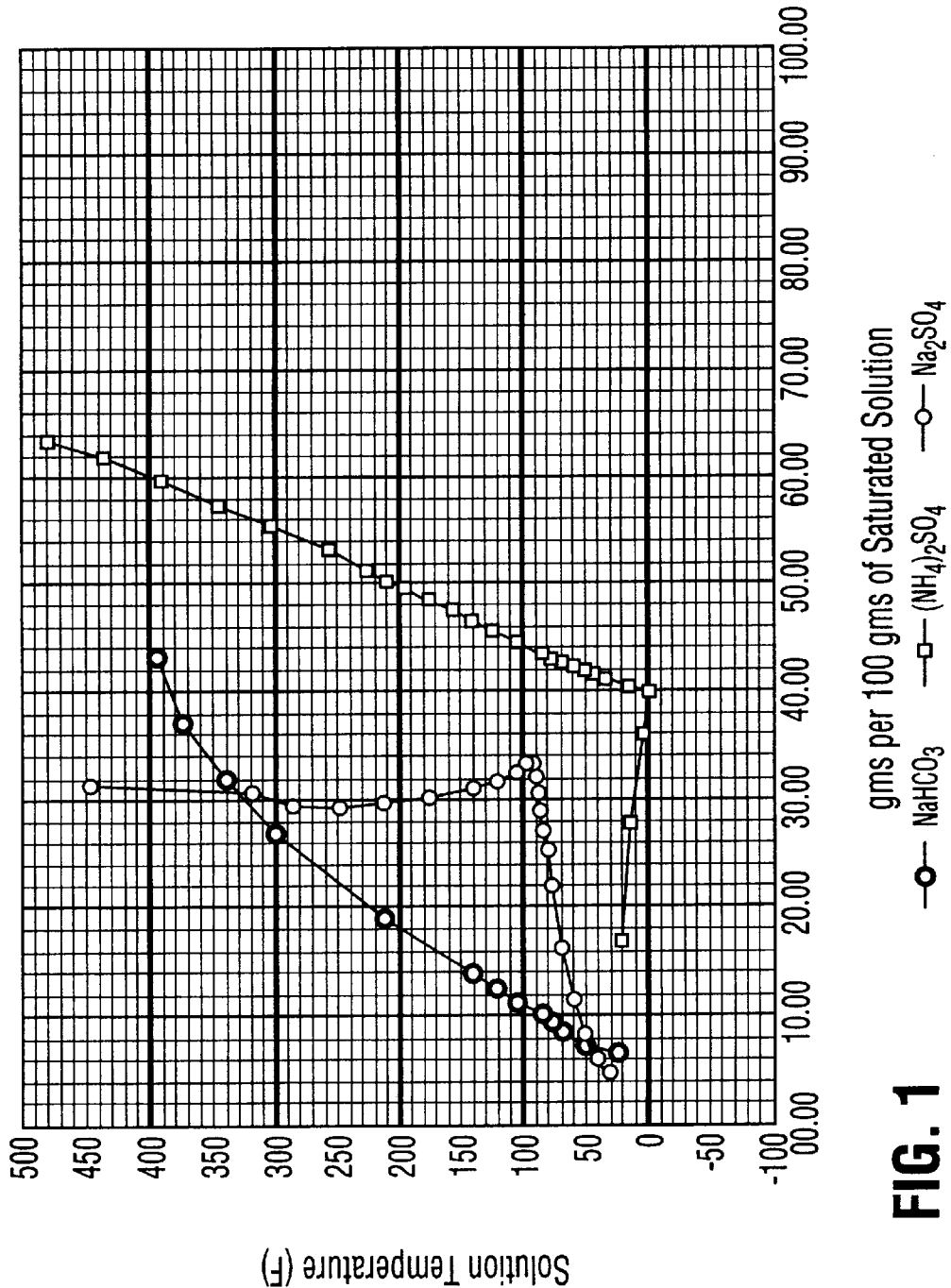
FIG. 1 is a graphical representation of the solubility of sodium bicarbonate, ammonium sulfate and sodium sulfate expressed as a function of solution temperature.

Referring now to FIG. 1, shown is a graphical representation of the solubility curves for sodium bicarbonate, ammonium sulfate and sodium sulfate. The data are expressed as a function of solution temperature. As is evident from the drawing, the solubility of the bicarbonate and the sodium sulfate have an overlapping area in which there will be a precipitation of both of these compounds. As indicated herein previously, this has posed a significant amount of difficulty in the prior art when one was to obtain a substantially pure precipitate of sodium bicarbonate without the formation of a sodium sulfate precipitate.

It has been found that if one simply obeys the solubility data, sodium bicarbonate and ammonium sulfate can be precipitated from a solution containing the molecular species indicated herein above without contamination of one precipitate with the other and further without the precipitation of the sodium sulfate as an intermediate precipitate.

It has been found that if the sodium bicarbonate crystal and solution is maintained at a temperature of at least 32° C., under the conditions as set forth with respect to the data in FIG. 1, that the sodium bicarbonate can be precipitated while the unreacted sodium sulfate remains in solution. If the temperature drops prior to the precipitation of the sodium bicarbonate, the result is that a precipitate of sodium sulfate solvate or decahydrate will plate out of solution offering tremendous operating difficulties.

In a chemical system as set forth with respect to the above equations, the system is generally a complex quaternary system, having a reciprocal salt pair relationship as follows:

$$2(NH_4)HCO_3+Na_2SO_4=2NaHCO_3+(NH_4)_2SO_4$$

In aqueous solutions above approximately 30° C. ammonium bicarbonate is unstable and dissociates in solution as ions. The subsequent precipitation of sodium bicarbonate from the system, basically reduces the system to a complex tertiary system with complications related to hydrate formation and double salt formation. The system and phase equilibria can be represented on an isothermal diagram which can be employed to obtain higher purity levels of single components.

The first step in the process is to complete the reaction to drive the equilibrium in the final equation such that the saturated sodium sulfate brine solution reacts to produce substantially pure sodium bicarbonate crystals. As is known in the art, numerous possible methods can be practiced for contacting the ammonia and the carbon dioxide with the sodium sulfate. As an example, the ammonia may be introduced into a solution of the sodium sulfate and carbon dioxide dispersed through the solution or the carbon dioxide may be dispersed through the saturated sodium sulfate solution and the ammonia subsequently added or both components may be dispersed through the solution simultaneously. Another possible alternative includes the use of ammonium bicarbonate.

Figure 2:
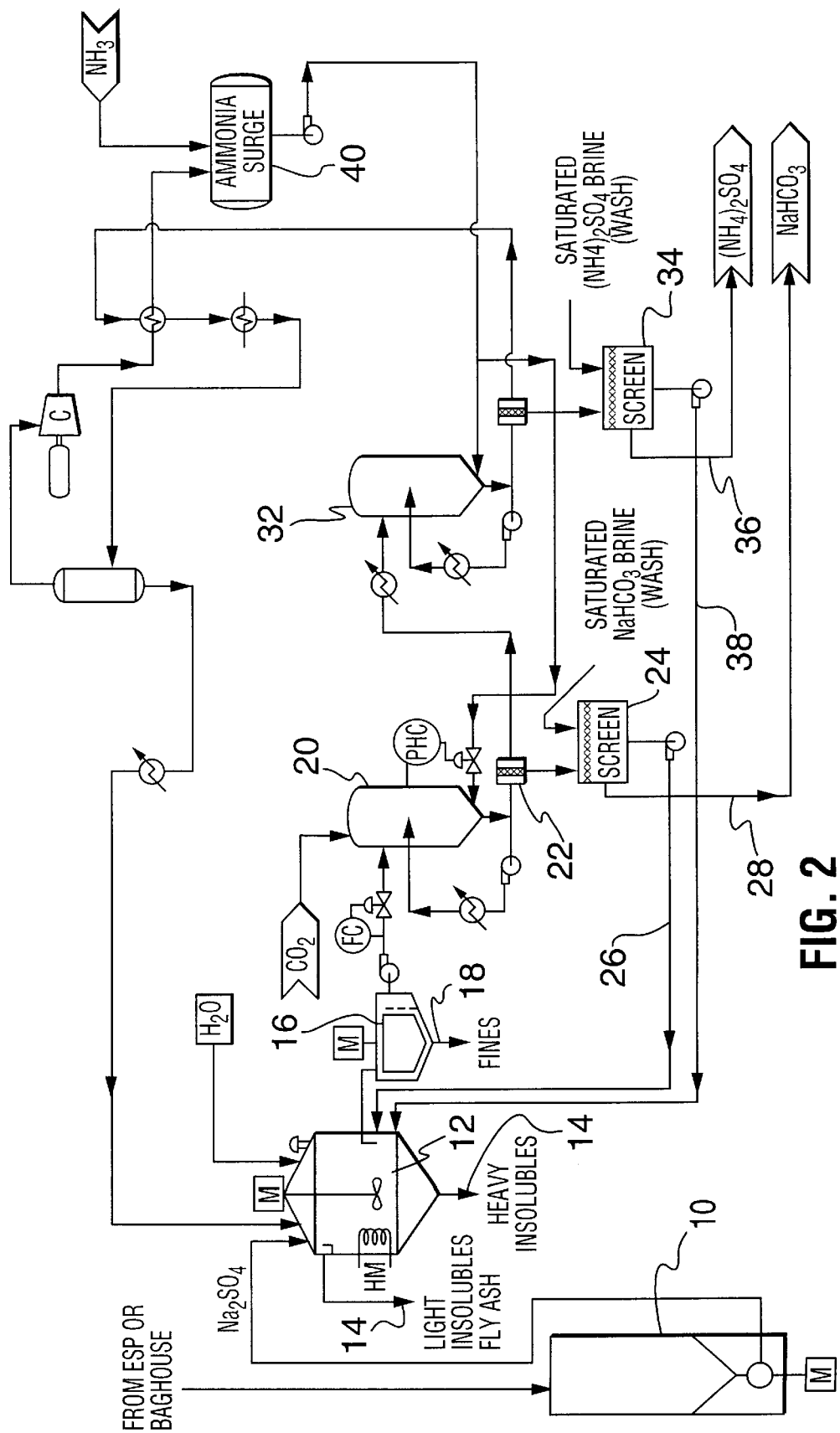
FIG. 2 is a flow chart illustrating one possible process route for effecting the method according to the present invention.

Referring now to FIG. 2, shown is one possible process route according to the present invention. A source of sodium sulfate, such as flyash, for example, from commercial steam boilers containing various levels of sodium sulfate may be collected from hot flue gas streams and transferred into a collection silo, globally denoted by numeral 10 in the drawings. From the silo, the flyash may be transferred at a controlled rate into an atmospheric mixing container 12, which container is maintained at a temperature from between about 32° C. and 42° C. The light and heavy insolubles are removed in a slurry form from the mixing container 12 at 14. The brine or filtrate is then transferred to a clarifier 16 and further filtered if necessary to polish the solution free of fine insolubles. Fine insolubles are removed from the clarifier at 18.

It has been found that one of the main difficulties which previously plagued methods practiced in the prior art, was that the temperature of the sodium bicarbonate formation reaction was not maintained within the above-mentioned parameters. The result of this is the formation of a hydrate commonly referred to as Glauber salt ($Na_2SO_4.10H_2O$). Another difficulty which previously plagued methods practices in prior art, was the formation of ammonium bicarbonate. It has been found that by maintaining the temperature within the above-stated range, the Glauber salt and ammonium bicarbonate does not form and therefore, does not affect the sodium bicarbonate formation process. In addition, at this temperature, a maximum amount of salt can be put in solution and thereby reduces the feed circulation rate.

Once the insolubles have been removed by the clarifier 16 at 18, the solution or brine which contains a small percentage of ammonia is passed into a first main reactor 20 where the formation of the sodium bicarbonate occurs. The temperature within the reactor may vary depending on the reactor configuration. The final temperature of the solution will be progressively reduced to from about 18° C. to about 21° C. with the brine feed temperature to the reactor being maintained above 32° C. The final temperature of this solution maximizes bicarbonate yield. This parameter prevents contamination with $Na_2SO_4$. Any suitable solvent may be employed and it will be apparent to those skilled in the art which are suitable possibilities to cover all pressure, temperature and other operated conditions. Pressure in reactor 20 will preferably be maintained between 50 to almost 250 psig. This ensures the ammonia remains dissolved in solution to effect the reaction. A crystallizer may be included downstream to effect crystallization of the sodium bicarbonate. Once the crystals have formed, they may be removed from the reactor through a filter means 22 which may comprise a pressure or non-pressure-type filter. Once the crystals are removed, they may be passed to a further filtration medium, an example of which may be a filtration screen 24, at which point the formed crystals may be washed with saturated cold sodium bicarbonate brine or methanol. A high yield is achievable. The wash may be then returned via line 26 to the mixing container 12. The formed bicarbonate crystals may be then removed from the system via line 28 for further uses.

The filtrate or brine from the first reactor is reheated back to approximately 32° C. The solution is maintained at a temperature of at least 32° C. and then passed into reactor 32. Once in reactor 32, the brine solution is subjected with excess ammonium at a concentration of approximately 20 weight percent.

The pressure in the reactor is carefully controlled by varying the injection of ammonia (approximately 490 kPa) thereby controlling the desired concentration of excess ammonium. In reactor 32, the injection of the solution with ammonia shifts the equilibrium solubility of the solution of the reaction, denoted hereinabove, to favour the formation of ammonium sulfate precipitate. The temperature in the reactor is maintained at 32° C. to keep free sodium cations soluble and therefore to prevent contamination of the ammonium sulfate with undesirable solvates. When desired, the ammonia concentration can be altered by changing the pressure control. Similar to the description for reactor 20, reactor 32 may include a crystallizer downstream to effect the formation of ammonium sulfate crystals. Once formed, the crystals may be passed onto a pressure filter medium 34 and washed with saturated cold ammonium sulfate brine wash. The so-formed ammonium sulfate crystals can then be removed by line 36 for further uses. The wash solution may be returned to the mixing container 12 via line 38 for further uses. The ammonia containing filtrate remaining after the precipitation of the ammonium sulfate crystals, may be flashed off, compressed and condensed and collected in to a surge drum 40 as is known in the art. Once collected, the ammonia solution may be used for reinjection in the system.

The final recovered solution, containing soluble levels of ammonia can be recycled to the mixing container 12 to complete the continuous operation.

By practicing the above method, a purity of ammonium sulfate greater than 50% by weight is achievable.

Advantageously, the ammonia can be substantially recovered for reuse which has positive economic advantages for the entire process.

Figure 3:
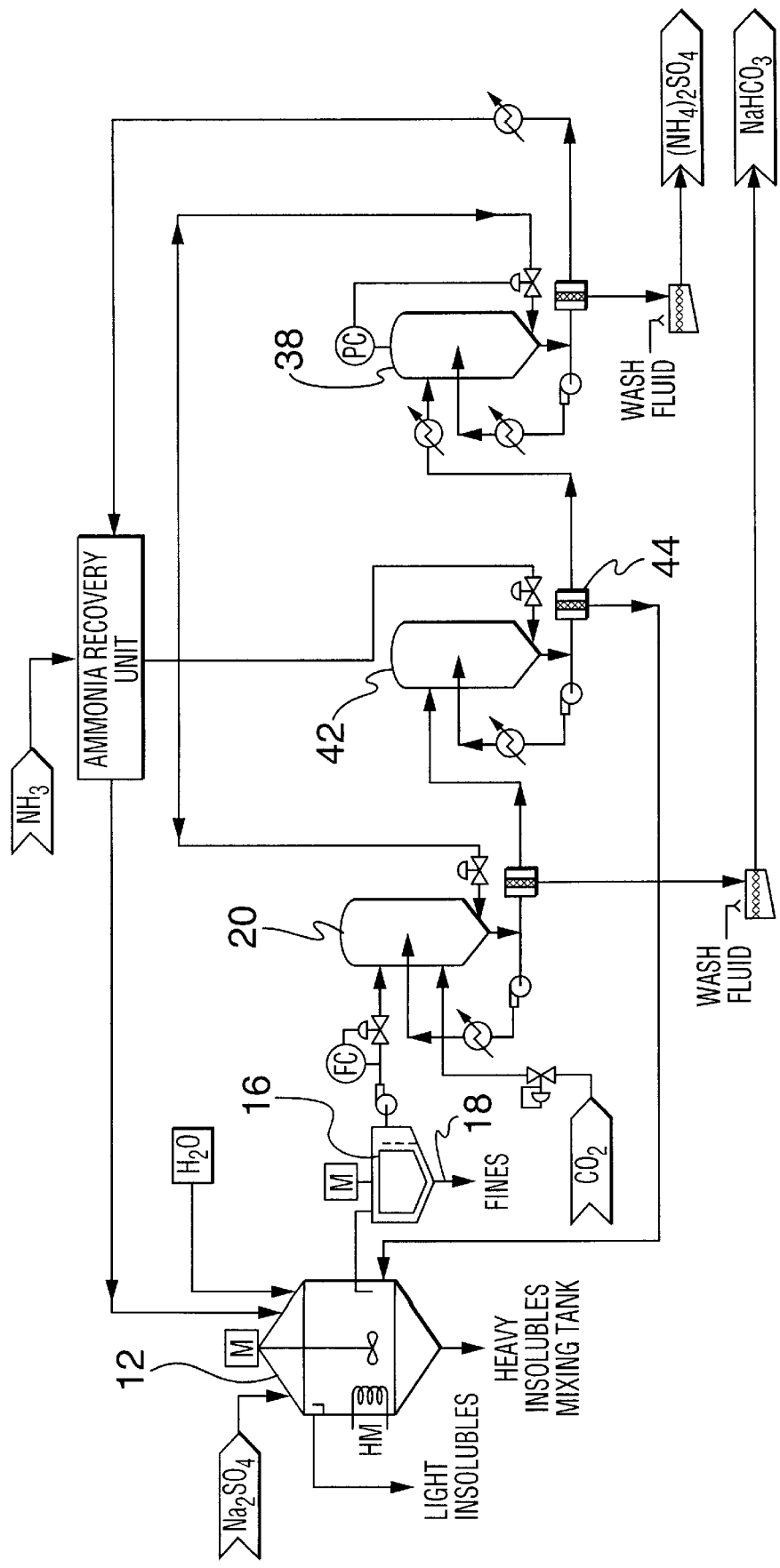
FIG. 3 is an alternate embodiment of FIG. 2.

FIG. 3 shows a further variation on the process according to FIG. 2. In FIG. 3, a brine conditioning step is employed between reactors 20 and 32. The brine conditioning step is effective to purify the feed stream for introduction into reactor 32 for eventual formation of ammonium sulfate by the further reduction of sodium ion concentration from the feed stream entering into reactor 32.

Once the sodium bicarbonate reaction has been completed, the bicarbonate precipitate is removed as set forth herein with respect to FIG. 2 and the brine is transferred to intermediate reactor 42. In reactor 42, the concentration of the ammonia is increased to saturate the solution while the temperature of the reactor is lowered to approximately 7° C. This results in the formation of a precipitate comprising either pure sodium sulfate, or a mixed precipitate of sodium sulfate and ammonium sulfate. These precipitates are then filtered by filter 44 and the crystals eventually passed back into contact with mixing container 12. The filtrate is then fed to reactor 32, maintained under at least the same pressure conditions as indicated for FIG. 2. Once in reactor 20, the filtrate undergoes the reaction as indicated herein above, the result is the formation of ammonium sulfate precipitate, however, the precipitate is formed in an environment where the sodium cation concentration is significantly reduced in view of the intermediate process using intermediate reactor 42. The result of the process is a solution concentration of a ammonium sulfate which will effect a precipitate of a concentration greater than 73% by weight.

Figure 4:
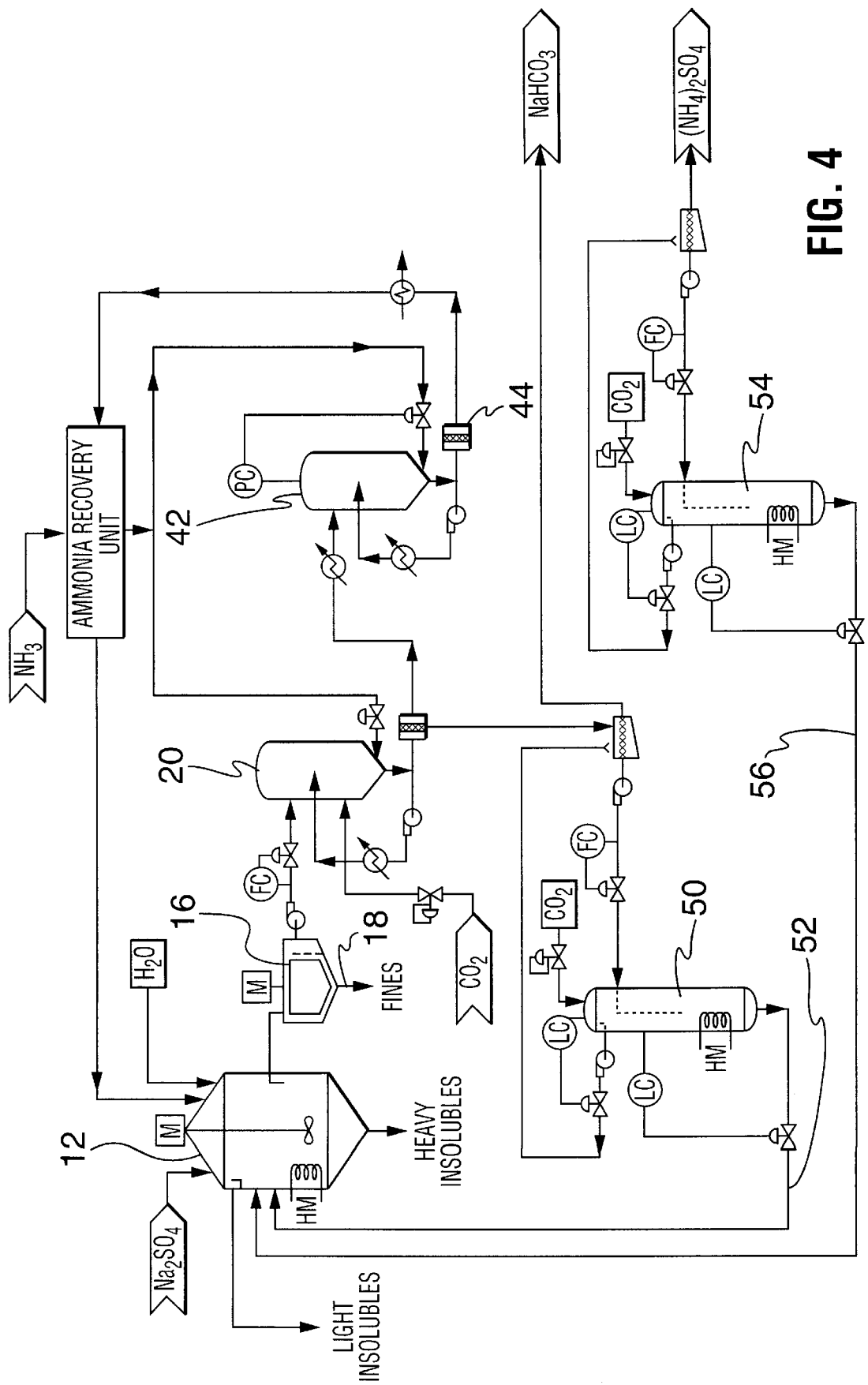
FIG. 4 is an alternate embodiment of FIG. 2.

Referring now to FIG. 4, shown is a further alternate arrangement by which the process may be practiced. In FIG. 4, the overall process may include a separate washing step for washing the sodium bicarbonate and ammonium sulfate precipitates separately. In one possible configuration, the sodium bicarbonate which is formed in reactor 20, may be passed into contact with a washing material, an example of which may be a source of methanol 50. The resulting filtrate may then be returned to mixing container 12 via line 52.

Similarly, the ammonium sulfate crystals formed in reactor 42, may be passed through a second independent source of methanol 54 with the filtrate being returned to mixing container by line 56. The ammonium sulfate crystals and bicarbonate can then be used for further uses.

Although the process as discussed herein has been indicated to be primarily conducted in water, it will be understood by those skilled in the art that any suitable solvent can be used provided the choice of solvent does not vary the solubility relationship necessary to effect the process. As one possible alternative, glycol may be employed as the solvent.

Figure 5:
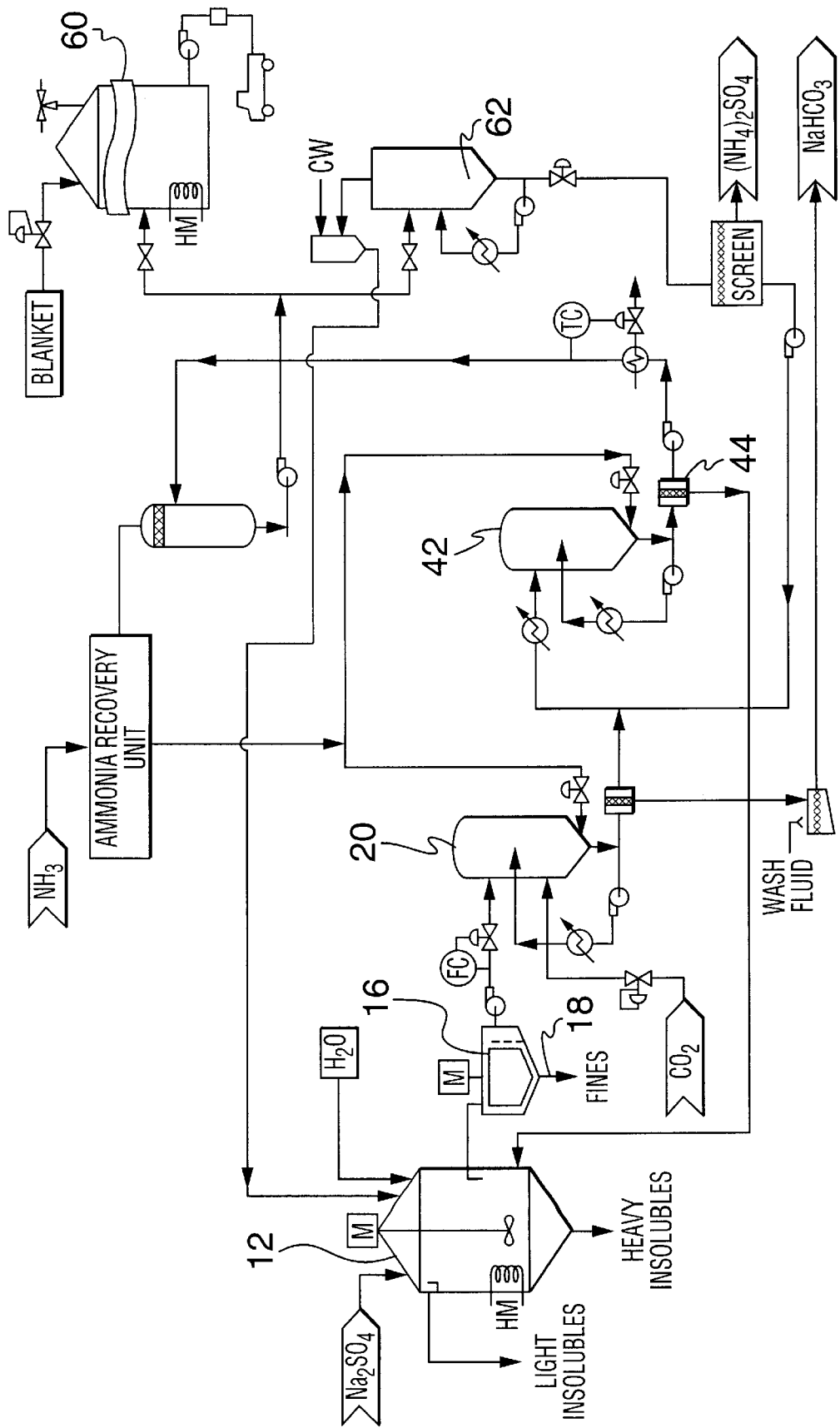
FIG. 5 is a further alternate embodiment of the process as set forth in FIG. 2.

Referring now to FIG. 5, shown is a further variation on the schematic process shown in FIG. 1. In the process shown in FIG. 5, the filtrate recovered from the sodium bicarbonate reaction can be made to be a commercially substantially pure liquid product, e.g. a fertilizer in the near saturated state. This affords the user the opportunity of blending the liquid product wits crystallization of the product in the desired form. As is illustrated in FIG. 5, the liquid product may be passed from reactor 20 to the brine conditioning container 42 where the temperature of the ammonia sulfate solution is reduced to approximately 7° C. as set forth herein previously with respect to FIG. 3. In this embodiment, the ammonia concentration is increased from about 0% to about 50% or greater by weight to therefore provide a supersaturated solution. The result is the precipitation of sodium sulfate or mixed salts of ammonium and sodium sulfate. The filtrate in this situation is substantially saturated liquid ammonium sulfate which can then be passed on to a storage unit 60. As a further alternative, a user may simply pick up the liquid ammonium sulfate or alternatively, the ammonium sulfate may be pumped into a conventional evaporator (crystallizer) 62 which would afford the user the opportunity to mix the liquid with additional fertilizer components etc. and have the final product crystallized.

The brine conditioning can be performed in a single step or it may be conditioned in multiple steps to achieve increased removal of sodium cations; this inherently leads to increased purity of the ammonium sulfate fertilizer. The above-mentioned steps can be any combination of known (salting out) steps i.e. evaporation, addition of excess ammonia, etc.

Figure 6:
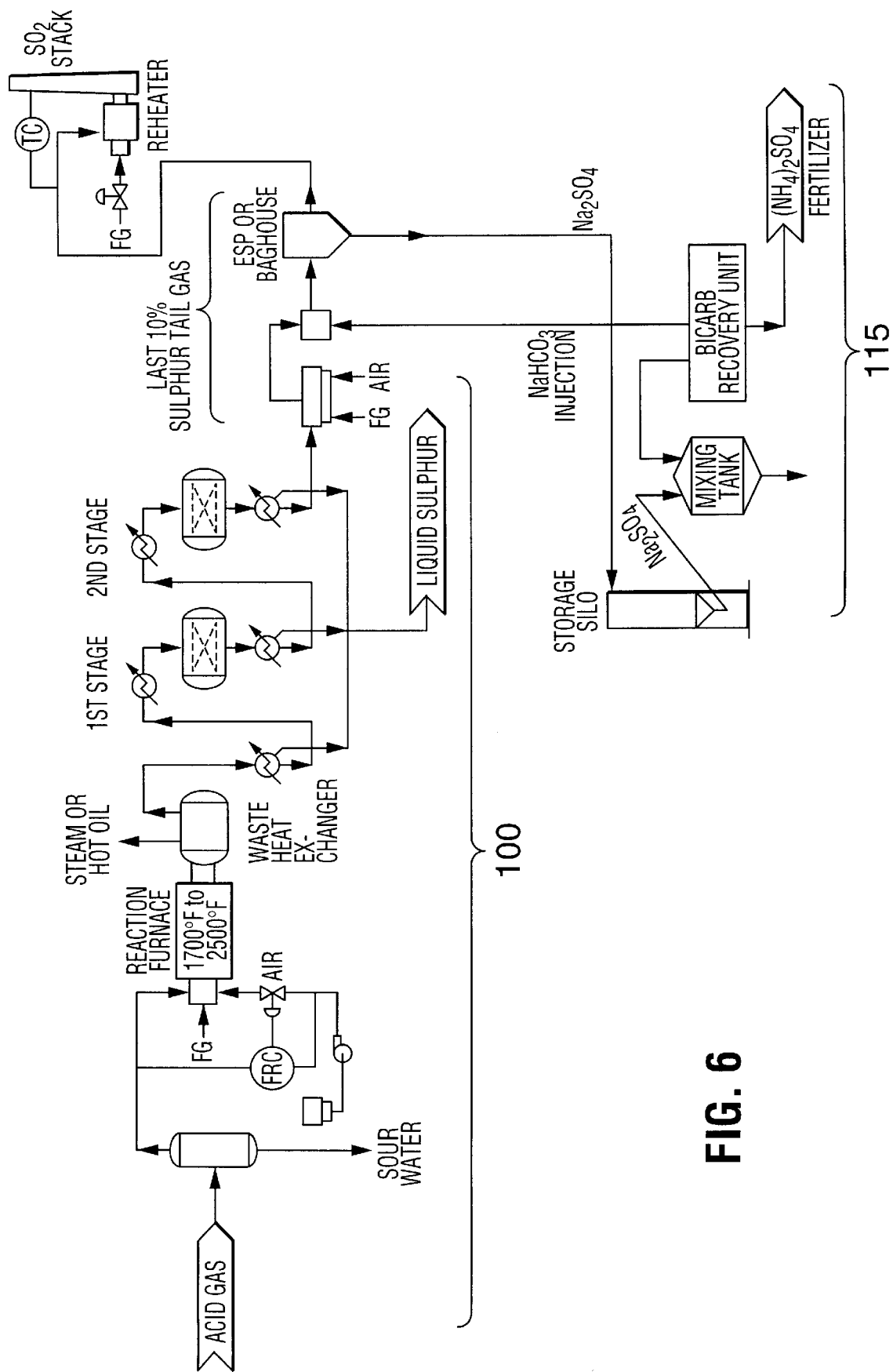
FIG. 6 is a still further alternate embodiment of the process of FIG. 2.

FIG. 6 shows a variation on the process where the bicarbonate recovery systems as set forth herein previously can be combined to be useful in a sulfur recovery plant. Generally speaking, the area designated by numeral 100 in FIG. 6 illustrates conventional apparatus employed for sulfur recovery from an acid gas stream by employing the modified Claus reaction, consisting of a single or multiple variation of thermal and catalytic recovery steps.

It is well known to those skilled in the art that the Claus process is useful for desulfurization. Generally speaking, the process is effected in two steps, namely:

$$H_2S + \frac{3}{2}O_2 = H_2O + SO_2$$

$$2H_2S + SO_2 = 2H_2O + \frac{3}{x}S_x$$

This generally results in a sulfur recovery of approximately 90% to 96% in a liquid sulfur state. The remaining sulfur containing component is recovered in sulfur recovery techniques such as Tail Gas units. By employing the recovery process as set forth herein previously, sodium bicarbonate can be introduced into the tail gas stream containing residual sulfur compounds and results can therefore be the production of ammonium sulfate as indicated in FIG. 6. As is illustrated in FIG. 6, the overall modified Claus process, denoted by numeral 100 can be combined with the overall process for producing ammonium sulfate, the group of steps of which is generally indicated by numeral 115 in the figure. The broad steps as illustrated in the figure are generally common steps to those shown in FIGS. 2 and 3. By combining the modified Claus process with the processes as set forth herein, the result is sulfur removal of the order of at least 95% or greater.

Figure 7:
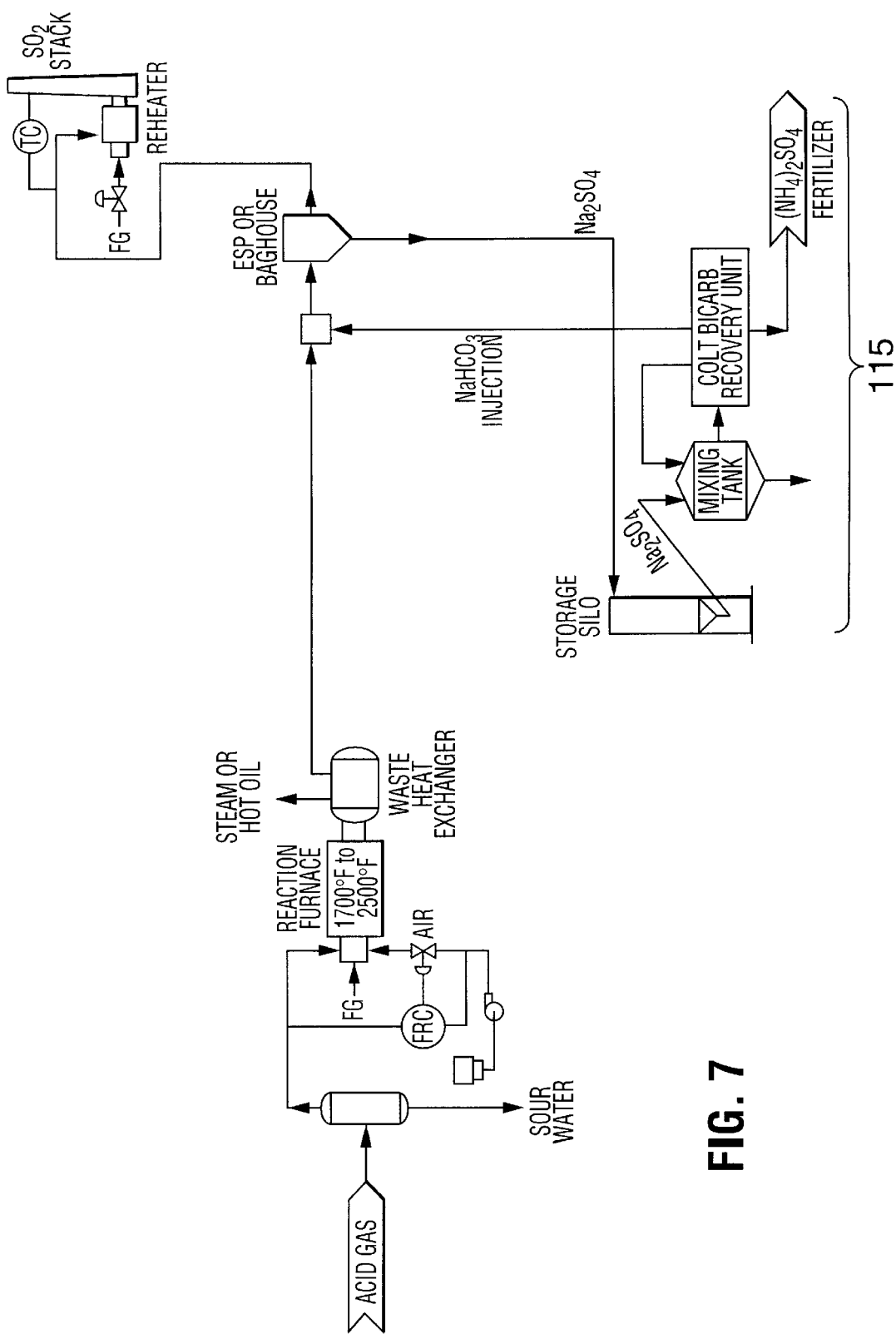
FIG. 7 is a further alternate embodiment of the process as set forth in FIG. 6.

Turning to FIG. 7, shown is a variant on the process schematically illustrated in FIG. 6, but for a lower volume production sulfur plant, typically having production levels of less than 10 MTD where economic constraints preclude the system shown in FIG. 6. The steps for the process are similar to those for FIG. 6 and the treatment of the sulfur compound is generally denoted by the sequence of events as indicated by numeral 115.

The acid gas stream may be as an alternative directly treated with liquid sodium bicarbonate or carbonate solution for desulfurization and form an alternate sulfur product.

Figure 8:
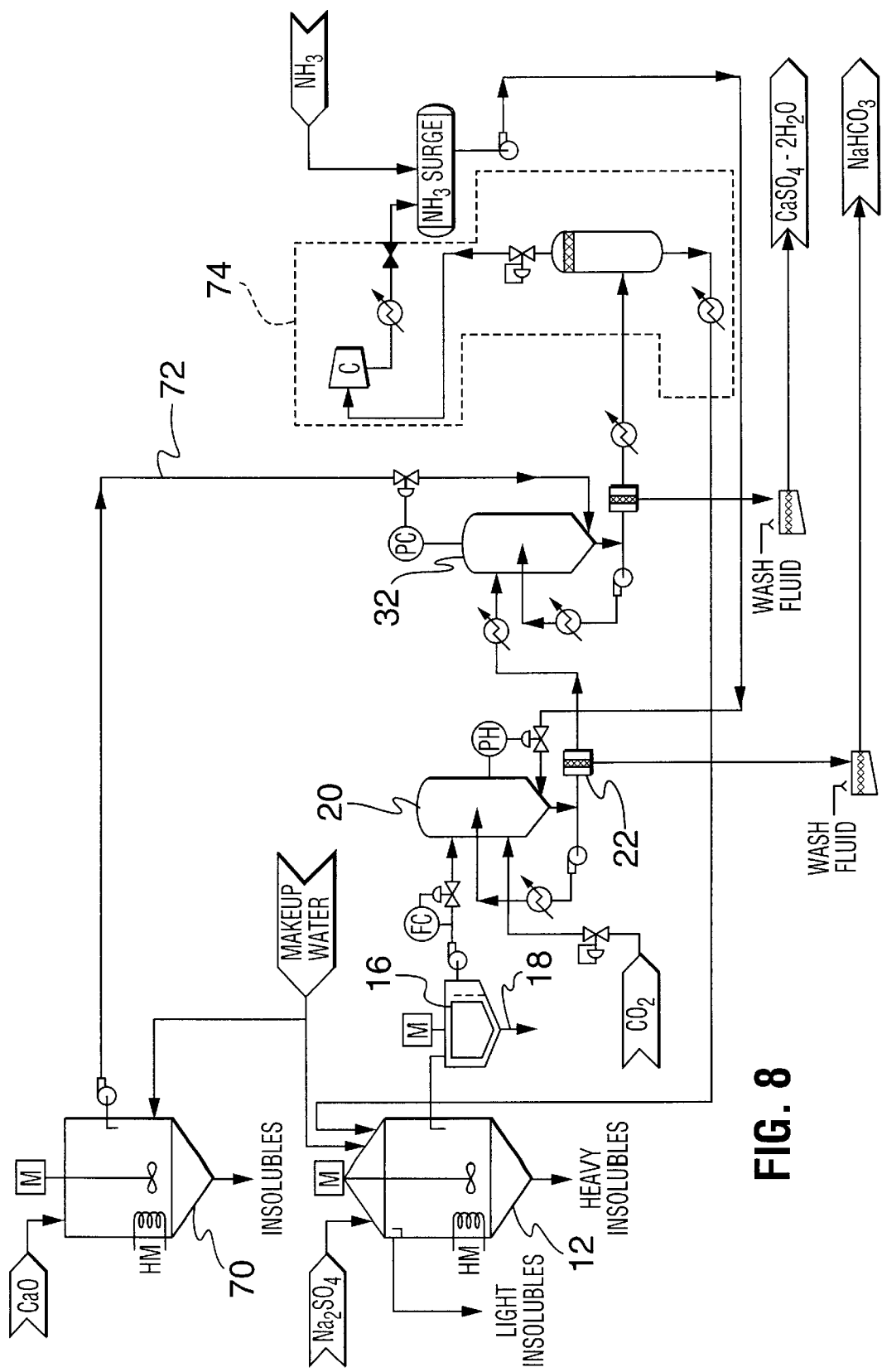
FIG. 8 is a further alternate embodiment of the process where gypsum is produced.

Turning to FIG. 8, showing schematically is a further embodiment according to the present invention. The embodiment shown, a lime mixing container 70 is provided for retaining lime in any form, e.g. a slurry or powder form to be introduced into reactor 32 via line 72. By providing this addition to the recovery unit, commercial or landfill gypsum can be produced along with sodium bicarbonate as illustrated in the figure, the arrangement shown may include ammonia recovery unit 74 which will include the usual gaseous recovery means well known to those skilled in the art. This is useful since the ammonia is liberated subsequent to precipitation of gypsum and therefore can be easily recovered.

Figure 9:
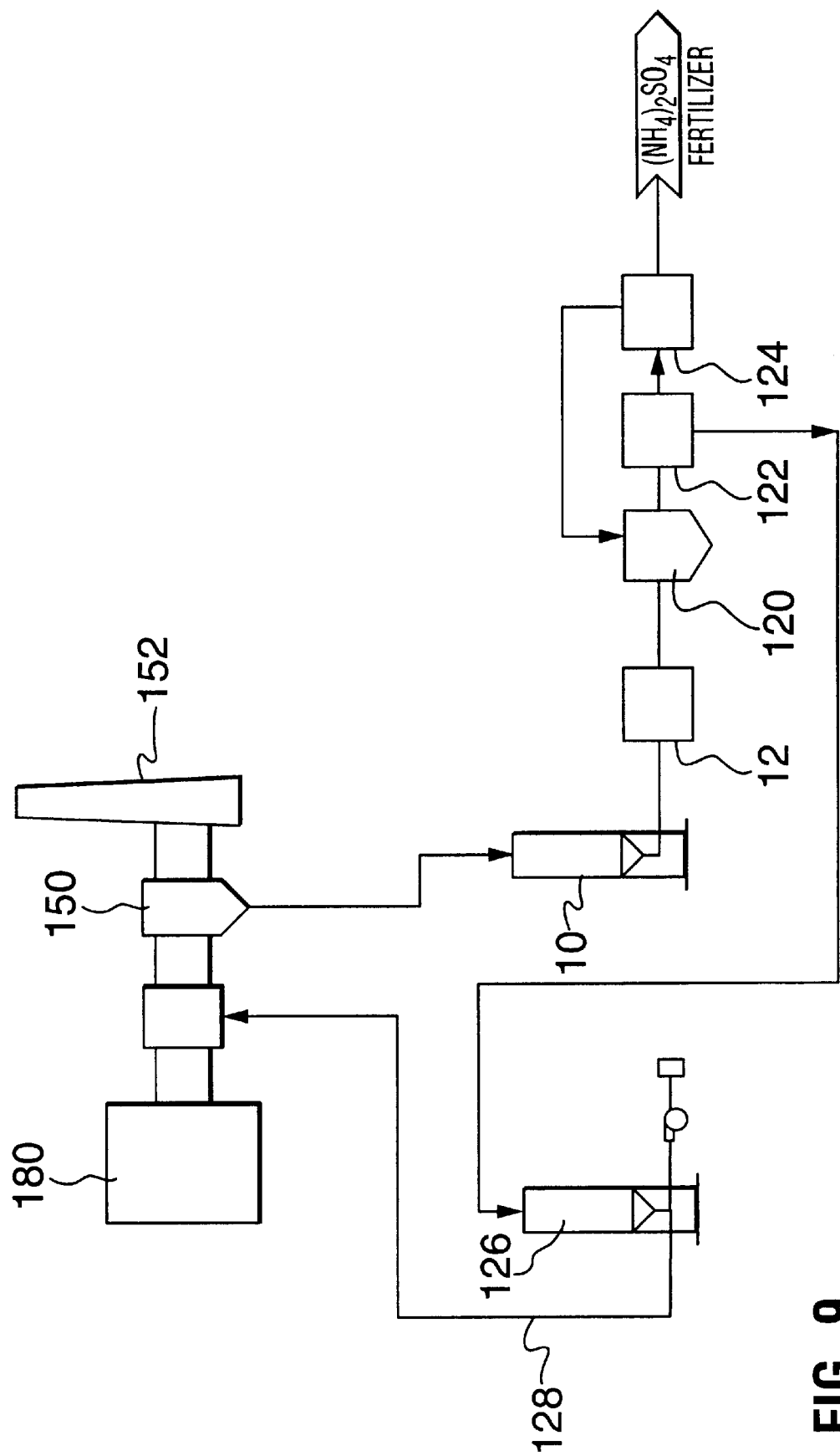
FIG. 9 is yet another embodiment of the process according to the present invention illustrating a scrubbing process.

With more specific reference to FIG. 9, there is illustrated an effective scheme whereby the recovery process as set forth herein, can be employed to regenerate dry sodium sulfate captured from a particulate collection device 150 such as an electrostatic precipitator or baghouse and produce sodium bicarbonate to be injected into the flue gas stream to primarily reduce sulfur components from sulfur sources such as an industrial boiler 180 and released by means of a stack 152. The practice of injecting a dry chemical into the hot flue gases is commonly referred to as DSI. By adapting the recovery process, discussed with respect to FIG. 3, to the DSI technique, the overall scheme becomes a continuous regenerative process with no waste streams or landfill requirements, no appreciable losses, and all by-products are immediately commercially useable. Using dry sodium bicarbonate as the reagent offers the additional advantages of further recovery of other undesirable components such as $NO_x$, HCl and $SO_3$ from the flue gases, and improve the performance of the downstream collection device 150 (i.e. ESP or baghouse). The dry sorbent technique, in addition, will not appreciably affect the temperature of the flue gases, thereby maintaining or improving the effluent emission dispersion from the stack 152.

As discussed previously, the sodium sulfate containing flyash compound is transferred from the collection device, stored in a silo 10 and blended into the feed preparation tank of the process denoted by 115 (FIGS. 6 and 7). The feed is processed in the bicarbonate recovery system 122 and the sodium bicarbonate is passed into a dry sorbent injection unit 126 and reintroduced into the system via line 128. By-product from the bicarbonate recovery unit 122 is transferred to the fertilizer recovery unit 124, the resulting product is commercial grade fertilizer. It will be appreciated that the process can be easily conducted under wet conditions as will as be appreciated.

Figure 10:
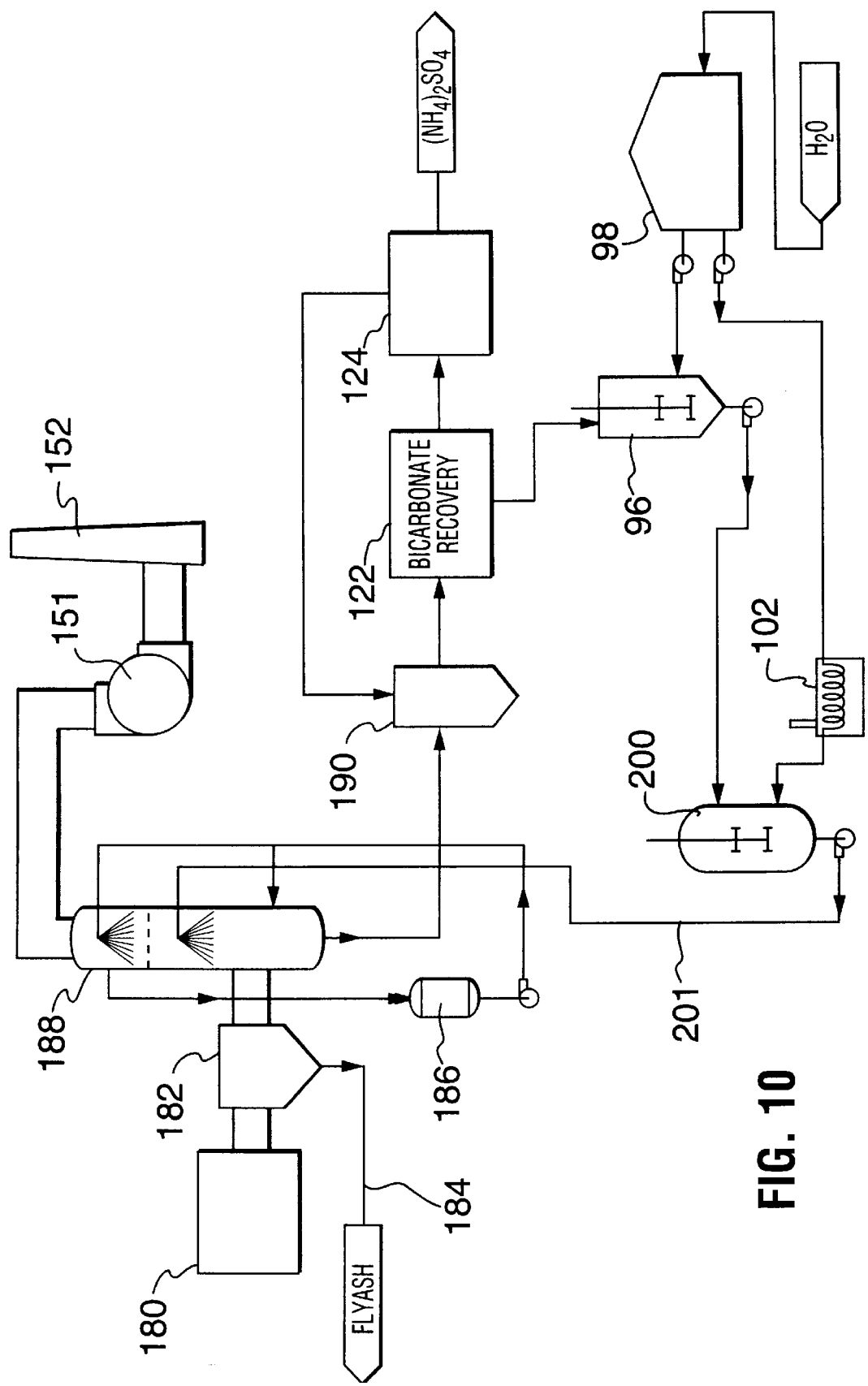
FIG. 10 is an alternate embodiment illustrating how the process can be adapted for use in a wet scrubbing flue gas desulfurization scheme to regenerate sodium bicarbonate from the captured sodium sulfate solution.

Turning to FIG. 10, shown is a further variation on the overall process according to the present invention. In FIG. 10, a flue gas desulfurization (FGD) process using a wet sodium bicarbonate injection system for desulfurization, employs sodium carbonate or bicarbonate as the active reagent.

In the embodiment illustrated, flue gas from the industrial boiler or tail gas unit, represented by numeral 180, is passed into an electrostatic precipitator or baghouse 182 or other recovery device to remove flyash at 184. A water wash container 186 is provided to circulate wash water in the upper section of the scrubber 188 and accumulated levels of precipitates and fluids are drawn off from container 186 and passed to the lower section of the scrubber 188. Once sodium sulfate is collected from the bottom of scrubber 188 as a product of the scrubbing procedure, it is then further transferred to mixing container for thickening and clarification to a saturated state for feeding into bicarbonate recovery apparatus 122. From apparatus 122 sodium bicarbonate is filtered from the solution and washed in either open screen, pressure type, vacuum type, centrifuge or cyclone type filters or any combination of these. The bicarbonate precipitate is washed and reduced to less than 10% liquid and then fed as a slurry into a bicarbonate slurry container 96 at approximately 700 kPa. At this point, the bicarbonate slurry in container 96 is mixed with clean boiler feed water supplied to container 96 from a feed water supply container 98. The feed water is maintained at a temperature of approximately 48° C. The slurry is continually mixed and ranges in a concentration of between about 20% by weight to about 40% by weight. The slurry is then transferred to a high pressure solution container 200 at a pressure of approximately 1050 kPa, where a saturated solution is formed. A saturated bicarbonate solution is created using additional boiler feed water from container 98 which is heated to approximately 176° C. by an injection water heater 102. The final saturated concentrated solution is then injected into wet scrubber 188 for sulfur dioxide removal via line 201.

It will be appreciated by those skilled in the art, that sodium carbonate can be used as a replacement to sodium bicarbonate. The conversion can easily be accomplished by, for example, calcining the bicarbonate in a dry form or by increasing the temperature in a liquid form and recovering the carbon dioxide for recycle to the bicarbonate recovery apparatus 122. Other suitable methods will be apparent to those skilled. The ammonia used in the process can be recovered in a recovery process as set forth herein with respect to other embodiments and this is equally true of the ammonium sulfate and other compounds in the process.

The temperature, pressure and concentration of reagent in the final injection solution can be varied to control the level of $SO_2$ removed and the final flue gas temperature exiting the wet scrubbing process. As a further example, the temperature and pressure can be reduced to near atmospheric conditions prevalent in the scrubber 188. The temperature can be reduced to 99° C. to eliminate water heater 102 and the high pressure reactor 200. This will result in a cooler final flue gas temperature resulting from the evaporative cooling effect which may or may not be detrimental to any specific application.

In addition, it will be appreciated by those skilled in the art, that the wet scrubber 188 can take any form of contacting the reactant solution with the sulfur containing flue gas, for example spray driers, etc.

It will be readily appreciated by those skilled that the solubility shift discussed herein can be effected by regular evaporation, or by the addition of any suitable compound which provides a salting effect without effecting the chemical composition of the desired product salts.

As a consequence of reactor vessel size, temperature stratification may exist within the reactors as set forth herein or the crystallizing vessels to enhance the crystal growth, stability and yield. In order to avoid undesirable effects caused by hydrate or solvate precipitation, the process can be performed in multiple vessels to circumvent these difficulties.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method of scrubbing sulfur compounds from gas containing sulfur oxide compounds and recovering inorganic values, comprising the steps of:
    a. providing a sodium sulfate solution;
    b. contacting said solution with carbon dioxide and ammonia or ammonium ions while maintaining a solution temperature of at least 32° C. to form a precipitate of sodium bicarbonate;
    c. recovering as a product said precipitate of sodium bicarbonate in step b.;
    d. filtering precipitated sodium bicarbonate;
    e. treating the remaining solution of step c. with sufficient ammonia of ammonium ions to form a saturated solution of ammonium sulfate and a precipitate of sodium sulfate from said solution;
    f. recovering as a product said precipitate of sodium sulfate;
    g. recovering ammonium sulfate as a product from the remaining solution from step e.;
    h. rehydrating said precipitate of sodium bicarbonate to form a concentrated sodium bicarbonate solution; and
    i. introducing said sodium bicarbonate solution into a conditioning vessel for the removal of a sulfur oxide compound.

2. The method as set forth in claim 1, wherein said method further includes the steps of:
    washing residual sodium sulfate out of said precipitate of sodium bicarbonate; and dehydrating said precipitate of sodium bicarbonate.

3. The method as set forth in claim 2, wherein said step of dehydrating said sodium bicarbonate comprises dehydrating said sodium bicarbonate precipitate to less than about 10% by weight liquid.

4. The method as set forth in claim 1, wherein said gas is flue gas.

5. The method as set forth in claim 4, further including the step of removing flyash from said flue gas.

6. The method as set forth in claim 5, further including the step of removing flyash with an electrostatic precipitator or a baghouse.

7. A method of scrubbing sulfur compounds from gas containing sulfur oxide compounds in a conditioning vessel, comprising the steps of:
   a. providing a sodium sulfate solution;
   b. contacting said solution with carbon dioxide and ammonia or ammonium ions while maintaining a solution temperature of at least 32° C. to form a precipitate of sodium bicarbonate;
   c. recovering as a product said precipitate of sodium bicarbonate in step b.;
   d. filtering precipitated sodium bicarbonate;
   e. treating the remaining solution of step c. with sufficient ammonia or ammonium ions to form a saturated solution of ammonium sulfate and a precipitated sodium sulfate from said solution;
   f. washing residual sodium sulfate out of said precipitate of sodium bicarbonate;
   g. dehydrating said precipitate of sodium bicarbonate; and
   h. introducing dry sodium bicarbonate into said conditioning vessel for the removal of a sulfur oxide compound.

8. The method as set forth in claim 7, further including the step of collecting dry sodium sulfate for introduction into said sodium sulfate solution in step a.

9. The method as set forth in claim 7, further including the step of recycling said carbon dioxide.

10. The method as set forth in claim 7, further including the step of thickening and clarifying said sodium sulfate prior to step b.

11. The method as set forth in claim 10, wherein said step of dehydrating said sodium bicarbonate comprises dehydrating said precipitated sodium bicarbonate to less than about 10% by weight liquid.

12. The method as set forth in claim 7, wherein said gas is flue gas.

13. A method of scrubbing sulfur compounds from gas containing sulfur oxide compounds, comprising the steps of:
   a. providing a source of sodium sulfate solution;
   b. contacting said source of sodium sulfate with carbon dioxide and ammonia or ammonium ions while maintaining a solution temperature of at least 32° C. to form a precipitate of sodium bicarbonate;
   c. recovering as a product said precipitate of sodium bicarbonate in step b.;
   d. filtering precipitated sodium bicarbonate;
   i. converting said precipitate of sodium bicarbonate into a sodium carbonate precipitate; and
   j. introducing dry sodium carbonate into a conditioning vessel for removal of a sulfur oxide compound.

14. The method as set forth in claim 13, further including the step of recycling carbon dioxide.

15. The method as set forth in claim 13, wherein said step of converting said sodium bicarbonate to sodium carbonate comprises calcining said sodium bicarbonate precipitate.

16. The method as set forth in claim 13, wherein said step of converting said sodium bicarbonate to sodium carbonate comprises elevating the temperature of the sodium bicarbonate precipitate in solution.

17. The method as set forth in claim 13, further including the step of filtering thickening and clarifying said sodium sulfate prior to step b.

18. The method as set forth in claim 17, further including the step of filtering said precipitated sodium carbonate prior to step i.

19. The method as set forth in claim 13, wherein said gas comprises flue gas.

20. The method as set forth in claim 19, further including the step of removing fly ash from said flue gas.

21. The method as set forth in claim 20, further including the step of removing fly ash with an electrostatic precipitator or baghouse.

22. A method of scrubbing sulfur compounds from gas containing sulfur oxide compounds, comprising the steps of:
   a. providing a source of sodium sulfate solution;
   b. contacting said source of sodium sulfate with carbon dioxide and ammonia or ammonium ions while maintaining a solution temperature of at least 32° C.to form a precipiate of sodium bicarbonate;
   c. recovering as a product said precipitate of sodium bicarbonate in step b.;
   d. filtering precipitated sodium bicarbonate;
   e. treating the remaining solution of step c. with sufficient ammonia or ammonium ions to form a saturated solution of ammonium sulfate and a precipitate of sodium sulfate from said solution;
   f. recovering as a product said precipitate of sodium sulfate;
   g. recovering ammonium sulfate as a product from the remaining solution of step f.;
   h. washing residual sodium sulfate out of said sodium bicarbonate precipitate;
   i. converting said precipitate of sodium bicarbonate into a sodium carbonate precipitate; and
   j. introducing dry sodium carbonate into a conditioning vessel for removal of a sulfur oxide compound.

* * * * *